(12) United States Patent
Larvoire

(10) Patent No.: US 6,978,363 B2
(45) Date of Patent: Dec. 20, 2005

(54) SYSTEM AND METHOD TO ENABLE A LEGACY BIOS SYSTEM TO BOOT FROM A DISK THAT INCLUDES EFI GPT PARTITIONS

(75) Inventor: Jean-Francois Larvoire, Meylan (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 552 days.

(21) Appl. No.: 10/186,689

(22) Filed: Jul. 2, 2002

(65) Prior Publication Data

US 2003/0014622 A1 Jan. 16, 2003

(30) Foreign Application Priority Data

Jul. 3, 2001 (EP) .................................. 01410082
Mar. 20, 2002 (EP) .................................. 02354047

(51) Int. Cl.⁷ .......................... G06F 15/177; G06F 9/24
(52) U.S. Cl. ............................................. 713/1; 713/2
(58) Field of Search ....................... 713/1, 2; 711/162, 711/173, 163; 715/810

(56) References Cited

U.S. PATENT DOCUMENTS

| | | | |
|---|---|---|---|
| 5,136,711 A | | 8/1992 | Hugard et al. |
| 6,032,161 A | * | 2/2000 | Fuller ........................ 707/205 |
| 6,199,159 B1 | * | 3/2001 | Fish ............................. 713/2 |
| 6,430,663 B1 | * | 8/2002 | Ding ........................... 711/162 |
| 6,532,538 B1 | * | 3/2003 | Cronk et al. .................... 713/2 |
| 6,542,979 B1 | * | 4/2003 | Eckardt ...................... 711/173 |
| 6,691,213 B1 | * | 2/2004 | Luu et al. .................... 711/163 |
| 6,727,920 B1 | * | 4/2004 | Vineyard et al. ........... 715/810 |

OTHER PUBLICATIONS

"Extensible Firmware Interface Specification", INTEL, Online, <URL:www.mit.edu/afs/sipb/contrib/doc/EFI/EFISpec_v102.pdf>, Dec. 20, 2000, pp. i-xviii, 1-12, version 1.02, XP-002251939.

"Extensible Firmware Interface Specification", INTEL, Online, <URL:www.mit.edu/afs/sipb/contrib/doc/EFI/EFISpec_v102.pdf>, Dec. 12, 2000, pp. i-xviii, 1, 305-318, version 1.02, XP-002222019.

"UNIX Developer's Interface Guide for Intel-Based Servers (UDIG)", URL:www.projectudi.org/udig10.pdf, Dec. 1999, pp. I-v, 2-1 thru 2-5, version 1.0, XP-002239284.

"Multiple Bootable Operating System", IBM Technical Disclosure Bulletin, Jun. 1992, pp. 311-314, vol. 35, No. 1A, XP-000308879.

* cited by examiner

*Primary Examiner*—Thomas Lee
*Assistant Examiner*—Ji H. Bae
(74) *Attorney, Agent, or Firm*—Foley & Lardner LLP

(57) ABSTRACT

A system and a method to boot from a modified GPT partitioned disk with a legacy BIOS based system. The system and method allows for backward compatibility with the new GPT standard. A GPT-aware bootstrap code may be loaded by the legacy BIOS upon system start up.

20 Claims, 5 Drawing Sheets

*Prior Art*

100

200

SYSTEM AND METHOD TO ENABLE A LEGACY BIOS SYSTEM TO BOOT FROM A DISK THAT INCLUDES EFI GPT PARTITIONS

FIELD OF THE INVENTION

This invention relates generally to using partitions on a disk. More specifically, this invention relates to systems and methods to enable a legacy BIOS system to boot from a disk that includes EFI GPT partitions.

CROSS-REFERENCE TO COPENDING APPLICATIONS

In copending application Ser. No. 10/186,691 entitled COMPUTER SYSTEM HAVING FIRST AND SECOND OPERATING SYSTEMS, assigned to the assignee of the present invention and incorporated herein by this reference, there is described a method enabling a legacy bios system to boot a second operating system from a disk that includes EFI GPT partions. Although not limited thereto, the techniques described herein are employed in at least some embodiments of that invention.

BACKGROUND OF THE INVENTION

Since 1984, the de-facto standard legacy disk partitioning systems has been in use for MS-DOS based computer systems (these are also known as IBM compatibles). A partition is a contiguous space of storage on a disk (physical or logical). Each partition functions like a separate disk. Partitions may be accessed by a system firmware and also by an operating system (OS). A hard disk may contain one or more partitions. The legacy partitions are often formatted with file allocation tables (FATs) to partition hard disks, such as FAT12, FAT16 and FAT32.

FIG. 1 illustrates a hard disk 100 employing the legacy partitioning scheme. As shown, the legacy-partitioned hard disk 100 includes a master boot record (MBR) 110. The MBR 110 typically contains a standard bootstrap code, which includes information of the location of the code to boot the computer system. The MBR 110 also contains a legacy partition table, which contains four records (not shown). Each record of the legacy partition table can describe a partition. One record always describes a main partition 130.

The legacy-partitioned hard disk 100 also includes an end of track 120, which is unused except by some setup programs in WINDOWS OS. The reason for the end of track 120 is that the legacy partitioning scheme requires a partition to start on a track boundary, and the MBR 110 does not occupy the entire track. The end of track 120 occupies the remainder of the track not occupied by the MBR 110.

The legacy-partitioned hard disk 100 further includes the main partition 130, which contains bulk of the data and programs. For example, the actual OS program may be included in the main partition 130. The legacy-partitioned hard disk 100 can include up to three extended partitions 140 corresponding to the three remaining partition records in the MBR 110. The extended partition(s) 140 may be sub partitioned even further.

The capacity of the disks has grown tremendously, from about 5 megabytes (MB) in 1984 to 100 gigabytes (GB) and more today. This has allowed larger and larger partitions to be created on a hard disk, which has in turn allowed personal computer (PC) manufacturers and users to separate data into their own partitions. For example, a first partition may used to store an active operating system such as DOS, WINDOWS, and the like; a second partition may be used to store a recovery tool that is able to restore the active OS in case of failure; a third partition may be for diagnostic tools; and the like. However, the tremendous growth of disk capacities has pushed the limits of the legacy partitioning scheme, and in many cases, the disk capacities have gone beyond the legacy limits.

To overcome the limitations of the legacy partitioning scheme, PC manufacturers and independent software vendors (ISVs) developed their own system management and other software tools. In most or all cases, the tools are proprietary and thus are incompatible with each other. In addition, these proprietary tools tamper with the MBR of the of the legacy partitioning table.

Intel has introduced an Extensible Firmware Interface (EFI) specification for the IA-64 basic input output system (BIOS). The EFI specification includes a new partitioning scheme GPT (GUID Partition Table, GUID standing for global unique identifier—a universally unique 128-bit number) defining how the hard disks are to be partitioned. The GPT scheme overcomes the size limitations of the legacy schemes and does not tamper with the MBR.

FIG. 2 illustrates a hard disk 200 employing the GPT scheme. As shown, the GPT-partitioned hard disk 200 includes a protective MBR (PMBR) 210. Like the MBR 110 of the legacy-partitioned hard disk 100, the PMBR 210 of GPT-partitioned hard disk 200 contains a standard bootstrap code and a legacy partition table. The table entry of the PMBR 210 also includes a legacy protect entry. The GPT-partitioned hard disk 200 also includes an end of track 220, to maintain compatibility with existing legacy tools that do not understand GPT partition structures. The GPT-partitioned hard disk 200 further includes a GPT table header 240 and a GPT partition area 250. While not shown, a duplicate GPT table header exists at the end of the disk 200 for redundancy purposes.

The main drawback to the standard GPT is that the GPT requires EFI-compliant operating systems. In other words, an EFI-less system, i.e. a legacy BIOS system, will not boot from a hard disk that is GPT partitioned under the current standard. In addition, the standard GPT is not backward compatible with older PC operating systems. Thus the standard GPT cannot be adopted to situations where backward compatibility is important.

SUMMARY OF THE INVENTION

An embodiment of the present invention is a system to enable a legacy BIOS based system to boot from a disk that includes EFI GPT partitions. The system includes a master boot record including a GPT-aware boot strap code within the master boot record, wherein the GPT-aware boot strap code is loadable by the legacy BIOS. The system also includes a boot program area including at least one GPT boot program, wherein the at least one GPT program is executed prior to booting the legacy BIOS based system.

Another embodiment of the present invention is a method to enable a legacy BIOS based system to boot from a disk that includes modified EFI GPT partitions. The method includes determining whether at least one GPT boot program exists. The method also includes verifying a validity of the at least one GPT boot program in response to the determining step providing a positive result. The method further includes executing the at least one GPT boot program in response the verifying step providing a positive result.

The method yet includes creating a boot menu of available systems. The method yet further includes loading a selected system.

BRIEF DESCRIPTION OF THE DRAWINGS

Features of the present invention will become apparent to those skilled in the art from the following description with reference to the drawings, in which.

DETAILED DESCRIPTION

For simplicity and illustrative purposes, the principles of the present invention are described by referring mainly to an exemplary embodiment or embodiments of schemes for partitioning hard disks. However, it should be understood that the same principles are equally applicable to, and can be implemented in, many types of situations where storage devices are partitioned, and that any such variation does not depart from the true spirit and scope of the present invention.

Moreover, in the following detailed description, references are made to the accompanying drawings, which illustrate specific embodiments in which the present invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

According to an embodiment of the present invention, modifications may be made to the standard GPT disk such that a legacy BIOS based systems may be able to boot from the modified GPT disk. It should be noted that an EFI-compliant BIOS may also be booted from the same modified GPT disk.

Figure 1:
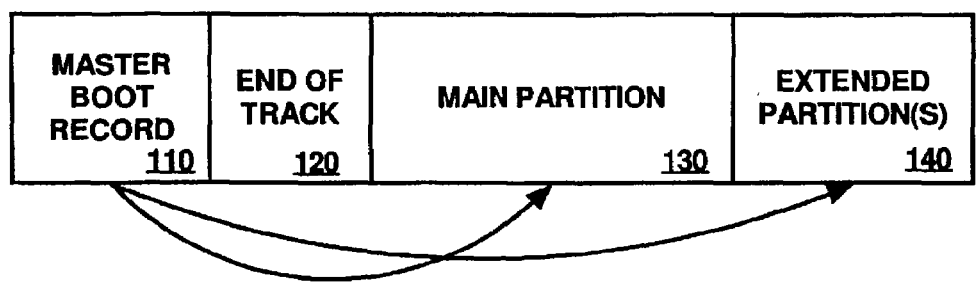
FIG. 1 illustrates a hard disk employing the legacy partitioning scheme.
Figure 2:
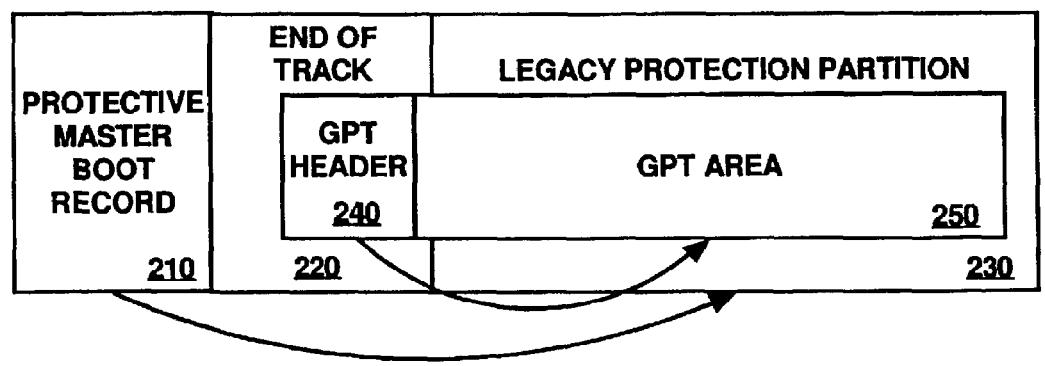
FIG. 2 illustrates a hard disk employing the GPT partitioning scheme.
Figure 3:
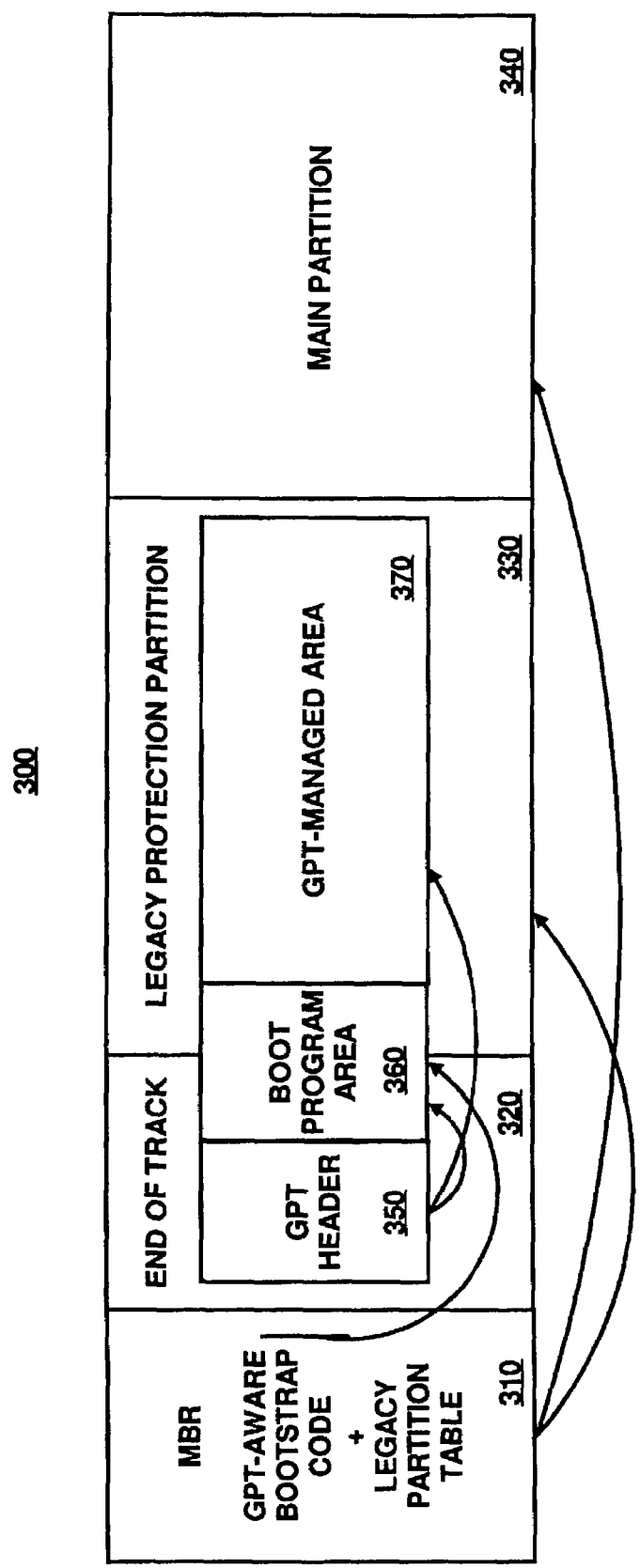
FIG. 3 illustrates a diagram of a MBR+GPT hybrid disk according to an embodiment of the present invention.

FIG. 3 illustrates a diagram of a MBR+GPT hybrid disk 300 according to an embodiment of the present invention. The MBR+GPT hybrid disk 300 may be divided into two portions—a legacy compatible portion and a modified GPT portion. The legacy compatible portion of the MBR+GPT hybrid disk 300 includes a master boot record (MBR) 310, an end of track 320, a legacy protection partition 330 and a main partition 340. The MBR 310 allows booting from legacy PCs, i.e., those without an EFI-compliant BIOS. The MBR 310 may be viewed as a simplified one sector boot program. By definition, the MBR 310 is outside of the area managed by the GPT.

The MBR 310 includes a GPT-aware boot strap code. As the name suggests, the GPT-aware boot strap code is aware that the modified GPT portion may exist. The GPT-aware boot strap code determines whether the GPT portion, which is indicated in FIG. 3 by an arrow from the GPT-aware boot strap code to a boot program area 360, may exist. If the GPT portion exists, the control of the boot process is transferred to one or more GPT boot programs within the boot program area 360 (explained in more detail below). If no GPT portion exists, the legacy partition table is parsed and a jump is made to the active partition, which are indicated in FIG. 3 by arrows from the MBR 310 to the legacy protection partition 330 and to the main partition 340.

The MBR 310 may also include table entries for the legacy partition table (up to 4 table entries) with one entry having information to load the main active partition 340.

The modified GPT portion of the MBR+GPT hybrid disk 300 may include a GPT header 350, the boot program area 360, and a GPT-managed area 370. The GPT header 350 complies with the format of a standard GPT header. Thus the GPT header 350 includes fields such as the Signature, Revision, HeaderSize, HeaderCRC32, and the like. Information regarding the standard GPT is readily available from Intel (http://developer.intel.com/technology/efi/download.htm) and is herein incorporated by reference.

The standard GPT specifies that a backup copy of the GPT header is to be placed at an end of the hard disk, addressed by the field AlternateLBA of the GPT header. This aids in the recovery process in the event that the primary GPT header becomes corrupted. According to an embodiment of the present invention, the backup of the GPT header 350 may be placed at an end of the modified GPT portion, which may not necessarily include the entire hard disk.

As noted above, one or more GPT boot programs may be included in the boot program area 360. Boot programs are executed at boot time prior to the operating system being loaded. For example, one boot program may be a diagnostic tool that checks and repairs the hard disk. Another boot program may check the status of the peripherals (printers, external modems, and the like). Each boot program may be defined in a separate GPT partition and identified by its own partition type global unique identifier (GUID).

The boot programs may be connected to form a chain of boot programs that are all executed before the operating system is loaded. Each boot program may contain a header structure, which defines among other things a link to the next boot program. The last program in the boot chain may be a boot menu program (more on the boot menu program below). These links allow the chain of boot programs to form. An example of a boot chain is 1) BIOS extensions; 2) GPT check & repair; and 3) boot menu.

It is preferred that one or more of the earlier boot programs in the chain be responsible for checking the MBR and the GPT areas, and repairing them if necessary. The repair may proceed automatically, through interactions with a human operator, or a combination of both. For instance and as described above, the GPT check & repair program may execute immediately after the BIOS extensions are executed.

Note that a boot program may be replaced by another boot program of the same type. For instance, a computer manufacturer may preload a simple boot menu that is sufficient for selecting a diagnostic protocol or an active operating system. This boot menu program may be later replaced with a more powerful and more sophisticated boot menu program that is able to select among many operating systems and diagnostic tools.

In this instance, a setup for the replacement boot program should ensure that the link from the previous boot program in the chain points to the replacement boot program. This may be accomplished by placing the replacement boot program to occupy the same location as the old boot program (at least the starting address). In this manner, no modifications need to made to the previous boot program in the boot chain. The same may be accomplished by modifying the link from the previous boot program to point to the replacement program. In addition, the setup should ensure that the link from the replacement program is identical to the link from the boot program that has been replaced.

Just as an existing boot program may be replaced, a new boot program may be inserted and/or an old boot program may be deleted. When inserting the new boot program, the setup should replace the link in the previous boot program in the chain to point to the new boot program and insert the previous link of the previous boot program as the link of the new program. When deleting the old boot program, the setup should replace the link of the previous boot program to be identical to the link of the deleted boot program. In general, managers that move partitions and/or programs around should follow the chain of boot programs and update the links as necessary.

To accomplish the boot chain execution process, it is preferred that each boot program, including the first GPT boot program, loads the first sector of the next boot program in sequence. The first sector of each boot program may then be responsible for loading the rest of the boot program. In this manner, loading of boot programs may be simplified.

However, before relinquishing control to the next boot program, it is preferred that the currently executing boot program verify the validity of the next boot program. For example, the currently executing boot program may verify the CRC of the next boot program before transferring control. In this manner, the likelihood of executing corrupted boot programs may be minimized.

It was discussed above that the last boot program may be the GPT boot menu program. Because the GPT boot menu program is the last in the chain, its link does not point to any other boot programs. The link is set to NULL or to any indicator signifying no more boot programs. The GPT boot menu program may be stored in a dedicated GPT partition with its own GUID. The partition may be vendor specific. Like other boot programs, the first sector of the GPT boot menu program may be responsible for loading the rest of the GPT boot menu program.

The GPT boot menu may scan GPT entries on all hard drives and dynamically build a list of the drives containing legacy boot sectors. In addition, the GPT boot menu may scan the active partition in the legacy partition table on the boot drive. The GPT boot menu may then display a menu with the names of each partition in the list and let a user choose. If the user does not choose within a specified timeout period, a default may be chosen for the user. The timeout period and the default operating system may be changed by outside utilities.

The GPT-managed area 370 includes GPT specified partitions. These partitions conform to the standard GPT specification. It is preferred that the GPT-managed area 370 of the GPT portion and the main partition 340 of the legacy compatible portion be non-overlapping. This may be accomplished by containing the modified GPT portion entirely within the end of track 320 and the legacy protection partition 330.

Note that an EFI system partition becomes optional. The absence of such partition indicates that the BIOS is not an EFI-compliant BIOS, which does not prevent GPT-partition-aware tools from operating. On the other hand, the presence of the EFI system partition does not provide any particular information. The disk 300 may have come from a system with EFI-compliant BIOS, while the current system may not have one. For reliability and security reasons, a backup of the MBR 310 may be stored at the last sector of the 1$^{st}$ track, i.e., in the last sector of the end of track 320.

Figure 4A:
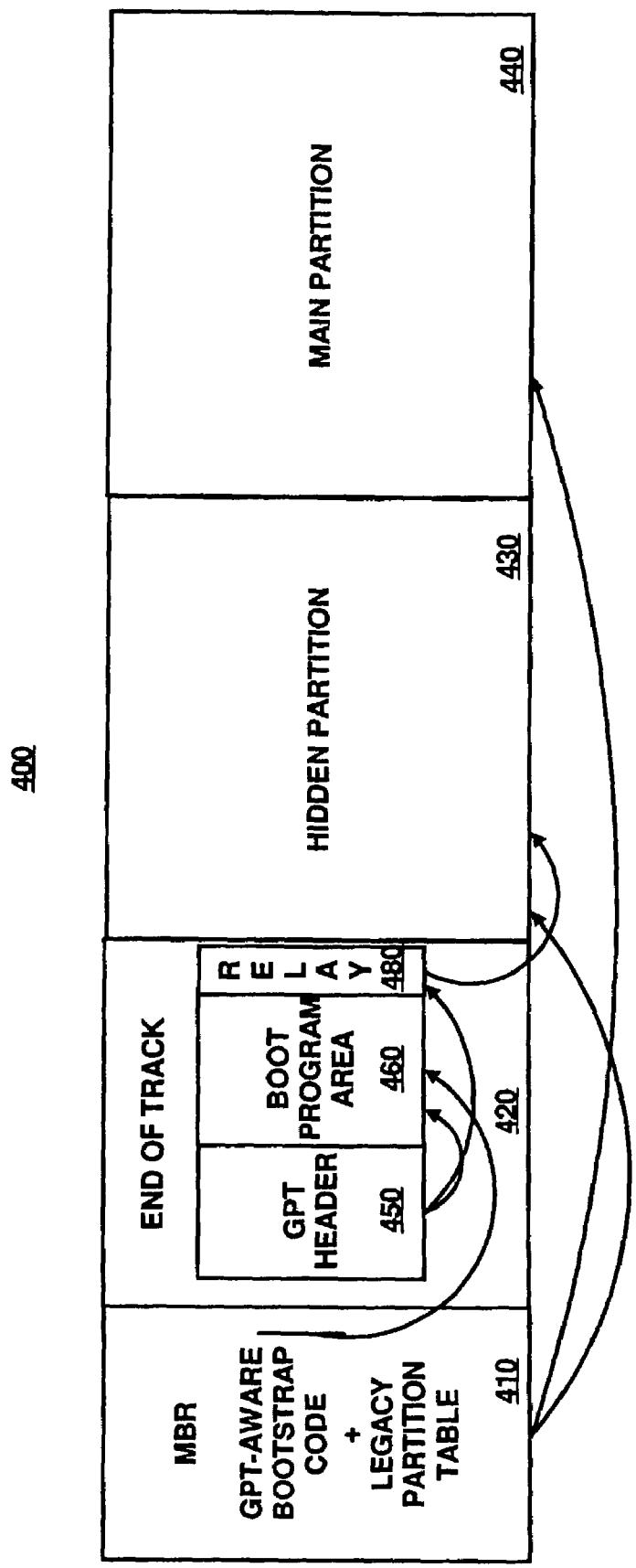
FIG. 4A illustrates a diagram of a legacy disk that has been modified with a micro-GPT partition according to an embodiment of the present invention.

FIG. 4A illustrates a diagram of a legacy disk that has been modified with a micro-GPT partition according to an embodiment of the present invention. The disk so modified still retains the ability to boot from a legacy BIOS based system and from an EFI-compliant BIOS. For the reasons described hereinbelow, the modified legacy disk is also referred to as a micro-GPT disk 400.

Like the hybrid disk 300 as shown in FIG. 3, the micro-GPT disk 400 may also be divided into two portions—a legacy compatible portion and a micro-GPT portion. As the name suggests, the micro-GPT portion may be limited in the amount of space. The micro-GPT structure allows GPT boot programs contained within the micro-GPT disk 400 to behave in a substantially similar manner the GPT boot programs contained within the hybrid disk 300. As will be demonstrated below, GPT boot programs may exist outside of the micro-GPT portion.

The legacy compatible portion of the micro-GPT disk 400 may include a master boot record (MBR) 410, an end of track 420, a hidden partition 430 and a main partition 440. The structure of the MBR 410 of the micro-GPT disk 400 is substantially similar to the MBR 310 of the hybrid disk 300. For example, the MBR 410 may include a GPT-aware boot strap code that transfers control to the GPT programs if a GPT partition or partitions exist as indicated by an arrow from the GPT-aware boot strap code to a boot program area 460.

If no GPT partition exists, then the GPT-aware boot strap code may transfer control to the active partition as indicated by the arrows from the MBR 410 to the hidden partition 430 and to the main partition 440. The MBR 410 may also contain table entries for the legacy partition table, including information to load the main active partition 440.

In the micro-GPT implementation, a backup copy of the MBR 410 may be located at the end of the first track, i.e., at the last sector of the end of track 420. By definition, the MBR 410 and the backup copy of the MBR are outside of GPT management. As a result, the last sector of the micro-GPT portion may be the next to the last sector of the end of track 420. As suggested, the micro-GPT portion of the micro-GPT disk 400 may be entirely contained within the end of track 420. Because only one track is involved, the space for micro-GPT partitioning may be limited.

Unlike the hybrid disk 300, the micro-GPT disk 400 may include a hidden partition 430 instead of the legacy protection partition 330. The hidden partition 430 may contain manufacturer-specific diagnostic tools.

The micro-GPT portion may include a GPT header 450. The format GPT header 450 complies with the format of the standard GPT header. However, due to the limited space of the micro-GPT portion, the sizes of the partitions may be smaller.

Unlike the standard GPT and the hybrid disk 300 as shown in FIG. 3, a backup copy of the GPT header 450 may be optional for the micro-GPT implementation. In this manner, additional space may be saved. Alternatively, backup entries may be kept outside of the micro-GPT portion, i.e., the backup entries may be located in the hidden or the main partitions 430 or 440. In this instance, GPT-aware partition managers should update the GPT backup header as needed.

The micro-GPT portion may also include a boot program area 460 containing one or more GPT boot programs. The structure of the GPT boot programs is substantially similar to the GPT boot programs of the hybrid disk 300 implementation and thus details will not be discussed here. The similarities include the chain of GPT boot programs and the boot menu program.

However, due to the space limitation of the micro-GPT portion, not all of the GPT boot programs may be contained within the boot program area 460. In other words, one or more boot programs may exist in the legacy portion such as the hidden partition 430 and/or the main partition 440. Indeed, it may be that even one complete GPT boot program may not be able to fit within the micro-GPT area. To enable linking of GPT program or programs that are outside of the micro-GPT area to the chain of boot programs, the micro-GPT portion may include a relay 480. The relay 480 may include information about GPT boot programs or operating systems stored outside the micro-GPT portion of the micro-GPT disk 400.

To decrease the risk of data loss in case where some of the beginning sectors of the track is destroyed, the main entry table and the partitions for the micro-GPT is preferred to be located towards the end of the track 420. In addition, because the space in the end of track 420 is limited, a micro-partitioning scheme may be utilized for the GPT partitions. Assuming that MBR 410, a backup of the MBR, GPT header, and a backup of the GPT header are to be implemented in the first track (including the end of track 420), the maximum usable micro-GPT space will be limited to N—4 sectors, where N represents the number of sectors per track. Typically, there are 63 sectors per track of disk.

Figure 4B:
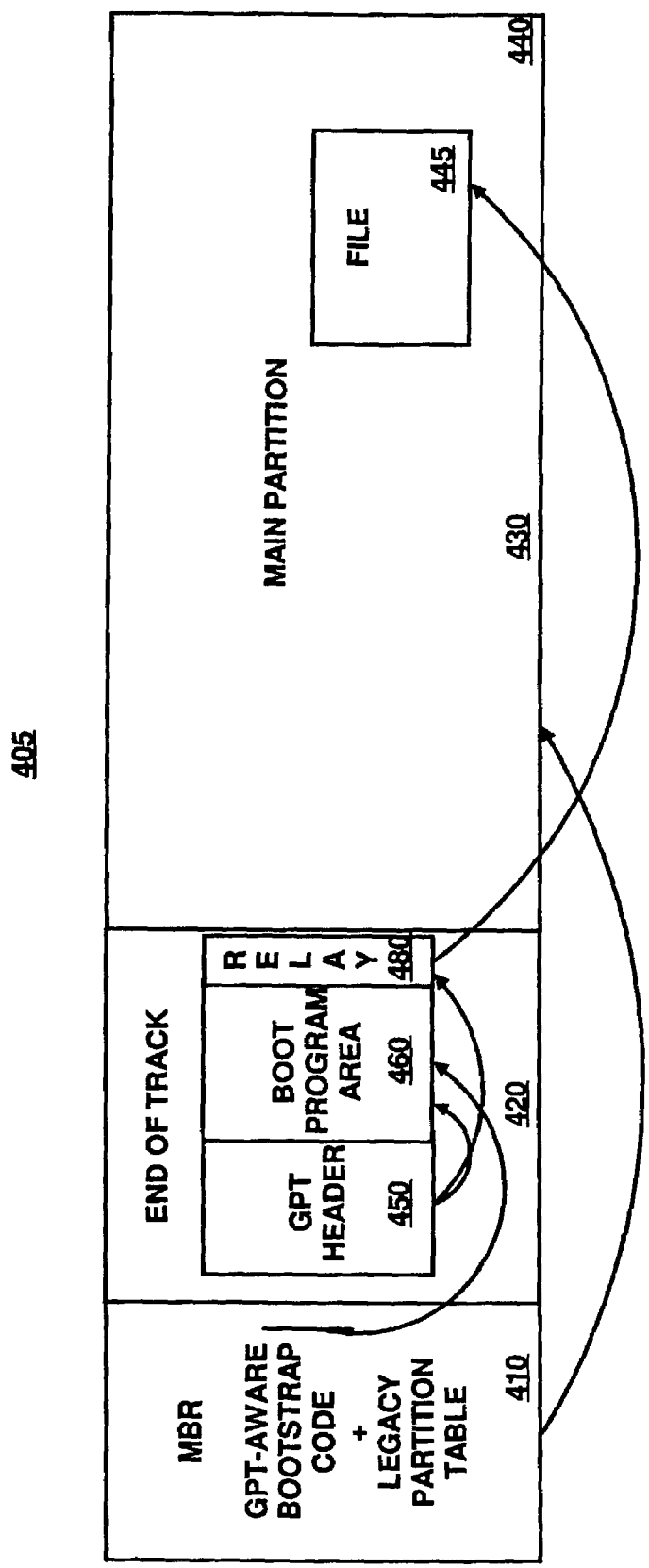
FIG. 4B illustrates another diagram of a legacy disk that has been modified with a micro-GPT partition according to an embodiment of the present invention.

FIG. 4B illustrates another diagram of a legacy disk that has been modified with a micro-GPT partition according to an embodiment of the present invention. The micro-GPT disk 405 is similar to the micro-GPT disk 400 of FIG. 4A. However, in this instance, the relay 480 may point to an unfragmented file 445 within the main active partition 440 to indicate a GPT boot program. This situation may occur for example where there are no diagnostic tools and thus the hidden partition is not necessary.

Figure 5:
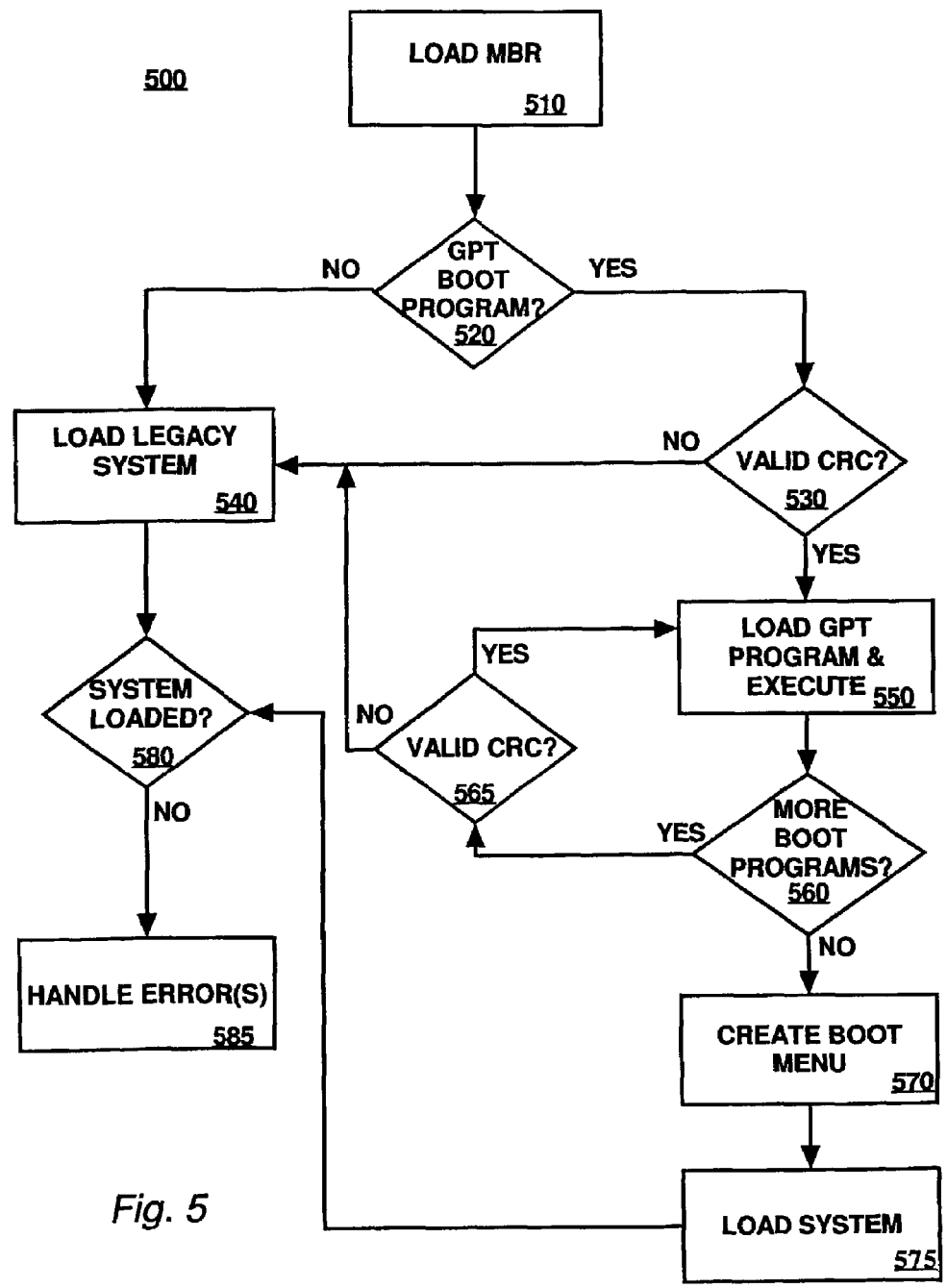
FIG. 5 illustrates a flow diagram of a boot method for an EFI-less system according to an embodiment of the present invention.

FIG. 5 illustrates a flow diagram of a boot method 500 for an EFI-less system, i.e. a legacy BIOS based system, according to an embodiment of the present invention. When a legacy BIOS based system boots from the MBR+GPT hybrid disk 300 shown in FIG. 3 or the micro-GPT disks 400 and 405 shown in FIGS. 4A and 4B, the legacy BIOS may load and relinquish control to the MBR 310, 410 (step 510). The GPT-aware boot strap code in the MBR 310, 410 may check for the presence of a first GPT boot program (step 520).

If the first GPT boot program is found, then the GPT-aware boot strap code may check the validity of the first GPT boot program, for example by verifying the CRC (cyclic redundancy check) number of the GPT boot program (step 530). If the CRC is invalid or there is no GPT boot program, the GPT-aware boot strap code may scan the legacy partition table in the MBR 310, 410 and load the legacy system (step 540). This is also illustrated by the arrows from the MBR 310 to the legacy protection partition 330 and to the main partition 340 (FIG. 3) and by the arrows from the MBR 410 to the hidden partition 430 (FIG. 4) and to the main partition 440 (FIGS. 4 and 4B). In this manner, the legacy operating system may be booted.

If the CRC of the first GPT boot program is valid in step 530, then a GPT-aware boot strap code may load the first GPT boot program (step 550). This is also illustrated by the arrow from the GPT-aware boot strap code of the MBR 310 to the boot program area 360 (FIG. 3) and from the GPT-aware boot strap code of the MBR 410 to the boot program area 460 (FIGS. 4A and 4B). The loaded GPT boot program may be executed. Once the GPT boot program executes, the GPT boot program may check to determine if there are more GPT boot programs (step 560).

However, as noted above, before loading and relinquishing control to a subsequent GPT boot program, the current GPT boot program may determine the validity of the subsequent GPT boot program (step 565). If the CRC cannot be verified, the chain of programs is then broken. At this point, the current GPT boot program may attempt to boot the legacy operating system (step 540). As indicated previously, one or more of the GPT programs may exist outside of the GPT areas, especially for the micro-GPT disks 400 and 405. These situations are facilitated by the relays 480.

The last GPT boot program in the chain of GPT boot programs may be the boot menu program. The boot menu program may scan both the legacy and GPT partition tables for bootable systems and create a boot menu (step 570) as described above. The boot sector for the selected system may be loaded and executed (step 575).

Regardless of whether the legacy defined system (in step 540) or the GPT selected system (step 575) is loaded, the system may fail to boot. The method 500 may determine whether the system is successfully loaded (step 580). If the chosen system is not loaded successfully, then special error handling procedures may be invoked (step 585). For example, an "int 18H" may be executed, which may execute a standard recovery mechanism. If the system loads successfully, then the system is up and running.

As noted above, FIG. 5 illustrates an exemplary boot method for legacy BIOS based systems. However, regarding the MBR+GPT hybrid disk 300, a standard EFI-compliant system may use the same MBR+GPT hybrid disk 300 to boot. In this instance, then the EFI BIOS Boot Menu may parse the GPT-managed area 370 for bootable partitions. None of the boot programs in the boot program area 360 are executed when the EFI-compliant BIOS based system is used.

While the invention has been described with reference to the exemplary embodiments thereof, it should be understood that various modifications may be made to the described embodiments of the invention without departing from the true spirit and scope of the invention.

The terms and descriptions used herein are set forth by way of illustration only and are not meant as limitations. In particular, although the method of the present invention has been described by examples, the steps of the method may be performed in a different order than illustrated or simultaneously. It should be understood that these and other variations are possible within the spirit and scope of the invention as defined in the following claims and their equivalents.

What is claimed is:

1. A system to enable a legacy BIOS based system to boot from a disk that includes EFI GPT partitions, comprising:
   a master boot record including a GPT-aware boot strap code within the master boot record, wherein the GPT-aware boot strap code is loadable by the legacy BIOS, based system the master boot record further including a legacy partition table;
   a boot program area including at least one GPT boot program, wherein the at least one GPT program is executed prior to booting the legacy BIOS based system; and
   a main partition that includes at least one legacy boot program, wherein the GPT-aware boot strap code initially checks the boot program area for existence of the at least one GPT boot program, and transfers control to the at least one GPT boot program in a case where at least one GPT boot program exists in the boot program area, and wherein the GPT-aware boot strap code then checks the legacy partition table to transfer control to the legacy BIOS based system in a case where there does not exist at least one GPT boot program in the boot program area.

2. The system of claim 1, wherein the disk is one of a MBR+GPT hybrid disk and a modified legacy disk that includes a micro-GPT portion.

3. The system of claim 2, wherein the MBR+GPT hybrid disk is also bootable by an EFI-compliant BIOS system.

4. The system of claim 2, wherein the micro-GPT portion includes a relay partition, wherein the relay partition includes information about one or more of the GPT boot programs and operating systems stored outside the micro-GPT portion.

5. The system of claim 1, wherein the boot program area includes a plurality of GPT boot programs.

6. The system of claim 5, wherein at least one of the plurality of GPT boot programs resides in a legacy partitioned area that does not correspond to a GPT-managed area.

7. The system of claim 5, wherein the plurality of GPT boot programs form a chain of boot programs that are all executed prior to any operating system being loaded.

8. The system of claim 7, wherein each GPT boot program includes instructions to load a first sector of a next GPT boot program in the chain of boot programs.

9. The system of claim 8, wherein the each GPT boot program includes instructions to verify a validity of the next GPT boot program prior to relinquishing control to the next GPT boot program.

10. The system of claim 7, wherein a first sector of each GPT boot program includes instructions to load a remainder of the each GPT boot program.

11. The system of claim 7, wherein a last GPT boot program is a boot menu program.

12. The system of claim 5, wherein any of the plurality of GPT boot programs is replaceable by another GPT boot program.

13. A method to enable a legacy BIOS based system to boot from a disk that includes modified EFI GPT partitions, comprising:

determining, by GPT-aware boot strap code existent in a master boot record of the disk, whether at least one GPT boot program exists in an end-of-track region of the disk;

verifying, by the GPT-aware boot strap code, a validity of the at least one GPT boot program in response to the determining step providing a positive result;

executing the at least one GPT boot program in response to the verifying step providing a positive result;

creating a boot menu of available systems; and loading a selected systems, wherein, in a case where the determining step provides a negative result or in a case where the verifying step determines that the at least one GPT boot program is invalid, the GPT-aware boot strap code transfers boot control to a legacy BIOS boot strap program stored in either a legacy protected partition or in a main partition of the disk.

14. The method of claim 13, wherein a plurality of GPT boot programs exist, the method further comprising:

verifying a validity of each of the plurality of GPT boot programs prior to executing the each of the plurality of GPT boot programs.

15. The method of claim 14, wherein the step of verifying the validity comprises:

verifying a CRC of the each of the plurality of GPT boot programs.

16. The method of claim 15, further comprising:

loading the each of the plurality of GPT boot programs based on a positive result of the verifying the CRC step.

17. A system to enable a legacy based BIOS based system to boot from a disk that includes EFI GPT partitions, comprising:

means for determining, by GPT-aware boot strap code existent in a master boot record of the disk, whether at least one GPT boot program exists in an end-of-track region of the disk;

means for verifying, by the GPT-aware boot strap code, a validity of the at least one GPT boot program in response to the determining step providing a positive result;

means for executing the at least one GPT boot program in response to the verifying step providing a positive result;

means for creating a boot menu of available systems; and means for loading a selected systems, wherein, in a case where the determining step provides a negative result or in a case where the verifying step determines that the at least one GPT boot program is invalid, the GPT-aware boot strap code transfers boot control to a legacy BIOS boot strap program stored in either a legacy protected partition or in a main partition of the disk.

18. The system of claim 17, wherein the means for verifying includes means for verifying a CRC of the at least one GPT boot program.

19. The system of claim 5, wherein at least one of the plurality of GPT boot programs is stored in a non-GPT-managed area of the disk.

20. The system according to claim 1, further comprising:

an end-of-track area in which the at least one GPT program is stored, wherein the end-of-track area also stores a backup of all data stored in the master boot record, and wherein when the master boot record is corrupted, the backup data stored in the end-of-track area is executed to boot the legacy BIOS based system.

\* \* \* \* \*